United States Patent
Armo et al.

(10) Patent No.: US 7,600,819 B2
(45) Date of Patent: Oct. 13, 2009

(54) ARMREST FOR USE WITH A VEHICLE SEAT

(75) Inventors: Sverker Armo, Eskilstuna (SE); Jonny Lindblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 11/164,529

(22) Filed: Nov. 28, 2005

(65) Prior Publication Data

US 2006/0202541 A1 Sep. 14, 2006

Related U.S. Application Data

(63) Continuation of application No. PCT/SE2004/000829, filed on May 28, 2004, now abandoned.

(30) Foreign Application Priority Data

May 28, 2003 (SE) .................................... 0301576

(51) Int. Cl.
*B60N 2/46* (2006.01)
(52) U.S. Cl. .............................. 297/411.35; 297/411.3; 297/411.37; 297/411.38
(58) Field of Classification Search ............ 297/411.32, 297/411.31, 411.3, 411.35, 411.38, 411.37; 403/115, 75, 76
See application file for complete search history.

(56) References Cited

U.S. PATENT DOCUMENTS

| | | | |
|---|---|---|---|
| 1,706,634 A * | 3/1929 | Seils ...................... 297/411.22 |
| 3,072,426 A * | 1/1963 | Gilbert ....................... 403/115 |
| 4,085,967 A * | 4/1978 | Spencer ....................... 297/115 |
| 4,277,102 A | 7/1981 | Aaras et al. |
| 4,441,592 A * | 4/1984 | Everett ..................... 188/264 A |
| 5,476,304 A * | 12/1995 | Gulliver et al. ............. 297/173 |
| 5,649,605 A * | 7/1997 | Ronne et al. ................... 180/23 |
| 5,678,896 A * | 10/1997 | Chung .................... 297/411.38 |
| 5,927,815 A * | 7/1999 | Nakamura et al. ..... 297/411.38 |
| 6,076,892 A | 6/2000 | Van Hekken et al. |
| 6,220,556 B1 * | 4/2001 | Sohrt et al. ............... 248/279.1 |
| 6,520,587 B2 * | 2/2003 | Noiseux ................. 297/411.37 |
| 6,966,528 B1 * | 11/2005 | Hare ........................ 248/178.1 |
| 7,032,272 B2 * | 4/2006 | Haenlein ...................... 16/366 |
| 7,055,910 B2 * | 6/2006 | Wright ................... 297/411.35 |

\* cited by examiner

*Primary Examiner*—Sarah McPartlin
(74) *Attorney, Agent, or Firm*—Novak Druce + Quigg LLP

(57) ABSTRACT

An armrest (1) for use with a vehicle seat (2), comprising a unit (3) for supporting an arm of an operator of the vehicle seated in the seat, a first fixing element (4) connected to the armrest unit (3) and a second fixing element (5) can be fastened to the seat (2) on the vehicle. The first and the second fixing element can be adjusted and locked in relation to one another by means of a device (6) for adjusting the position of the armrest unit (3) in relation to the seat when using the armrest. When using the armrest, the adjusting and locking device (6), which links the first fixing element (4) and the second fixing element (5) in at least two different positions, can be used to set the armrest unit (3) to different positions by moving the armrest unit (3) in a direction having a component in the horizontal plane, aligned so that the position of the armrest unit (3) is laterally variable in relation to the seat (2).

20 Claims, 9 Drawing Sheets ated 28 May 2004 which was published in English pursuant to Article 21(2) of the Patent Cooperation Treaty, and which claims priority to Swedish Application No. 0301576-5 filed 28 May 2003. Said applications are expressly incorporated herein by reference in their entireties.

ARMREST FOR USE WITH A VEHICLE SEAT

CROSS-REFERENCE TO RELATED APPLICATIONS

The present application is a continuation patent application of International Application No. PCT/SE2004/000829 filed 28 May 2004 which was published in English pursuant to Article 21(2) of the Patent Cooperation Treaty, and which claims priority to Swedish Application No. 0301576-5 filed 28 May 2003. Said applications are expressly incorporated herein by reference in their entireties.

FIELD OF THE INVENTION

The present invention relates to an armrest for use with a seat in a vehicle. The invention further relates to a vehicle seat provided with such an armrest and to a vehicle incorporating such an armrest.

BACKGROUND OF THE INVENTION

The present invention has applications in various types of vehicles but will hereinafter be described (by way of illustration, but in no way imposing limitations on the invention) in its form as an armrest for use in a wheeled loader provided with so-called comfort drive control (CDC). Vehicles of the wheel loader type are often provided with equipment to make them easy and comfortable to operate. For example, the vehicle may be controlled by means of a control lever fitted to an armrest so that the operator sitting in the driver's seat can rest his arm on the armrest while at the time controlling the vehicle by means of the control lever. Other functions, such as control of the gearbox in order to obtain the various gears or for shifting the vehicle between forwards and reverse drive can also be incorporated into the armrest and can be actuated by means of buttons or other types of controls arranged in the armrest.

The armrest, which is often fitted on the left-hand side of the driver's seat, viewed in the direction of travel, can generally be folded back from a substantially horizontal or slightly forward-inclined operating position to a more vertical raised, passive position so as not to limit the space between the driver's seat and the steering wheel in the vehicle when getting in or out.

Moreover, the armrest moreover often has a mechanism for adjusting the position of the armrest forwards or backwards in relation to the driver's seat so that the driver can individually select a desired operating position of the armrest and hence of the control lever.

Previously known armrests have the disadvantage, however, that they do not take sufficient account of the varying body size of different operators. This means that the working position for the operator will be ideal only for operators who have a certain body size. This is because the desired distance between the seated position (which is substantially the same for different operators) in the driver's seat and the arm support position on the armrest for the operator (in a horizontal direction at right angles to the direction of travel of the vehicle, i.e. laterally) varies from person to person. An unfavorable working position may mean that the operator finds it more difficult to carry out his work and runs the risk of strain injuries.

SUMMARY OF THE INVENTION

An object of the invention is to substantially reduce the aforementioned problem inherent in the prior art and to provide an armrest which affords operators of differing body size an ergonomic working position. It must be possible to achieve this while at the same time retaining a secure and simple stowing of the armrest, without the need to provide any new mechanism for moving the armrest between the operating position, and the raised passive position and without restricting the driver's freedom of movement.

The objects of the invention are at least in part achieved due to the fact that an adjusting and locking device, which links the first fixing element and the second fixing element in at least two different positions, can be used to set the armrest unit to different positions by moving the armrest unit in a direction having a component in the horizontal plane and aligned so that the position of the armrest unit is laterally variable in relation to the seat. This means that operators themselves can select and set the most favorable distance between the seat and the armrest unit in order to obtain a comfortable working position that is suited to their body size.

The invention also relates to a vehicle seat provided with an armrest configured according to the invention, and to a vehicle comprising such an armrest, as well as to the use of such an armrest.

Other advantages of the invention are set forth in the following description and will be appreciated by those persons skilled in the relevant art in view thereof.

BRIEF DESCRIPTION OF THE DRAWINGS

Referring to the accompanying drawings, a more detailed description of exemplary embodiments of the invention follow, and in which.

DETAILED DESCRIPTION

Figure 1:
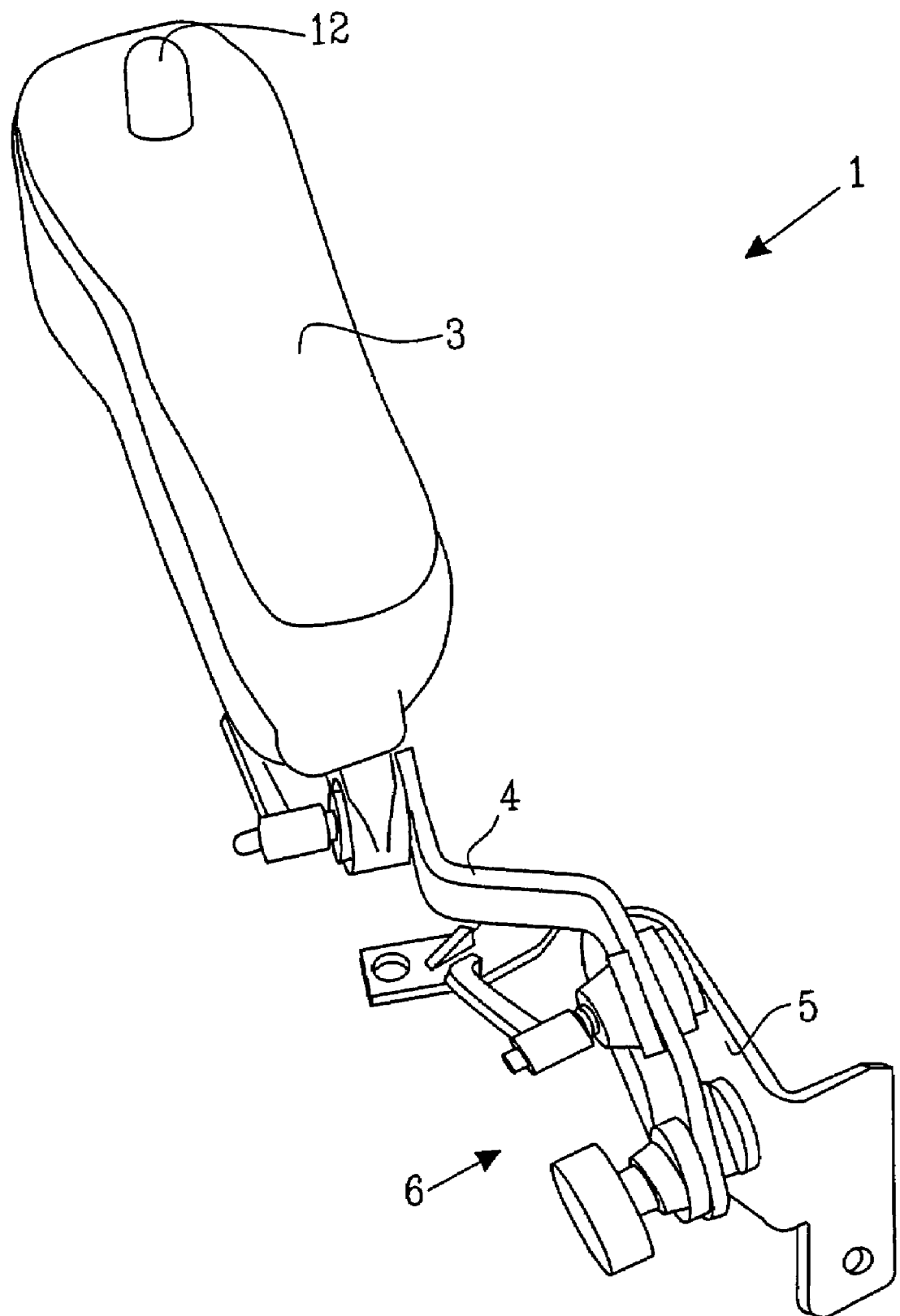
FIG. 1 is a perspective view of an armrest configured according to the invention.
Figure 2:
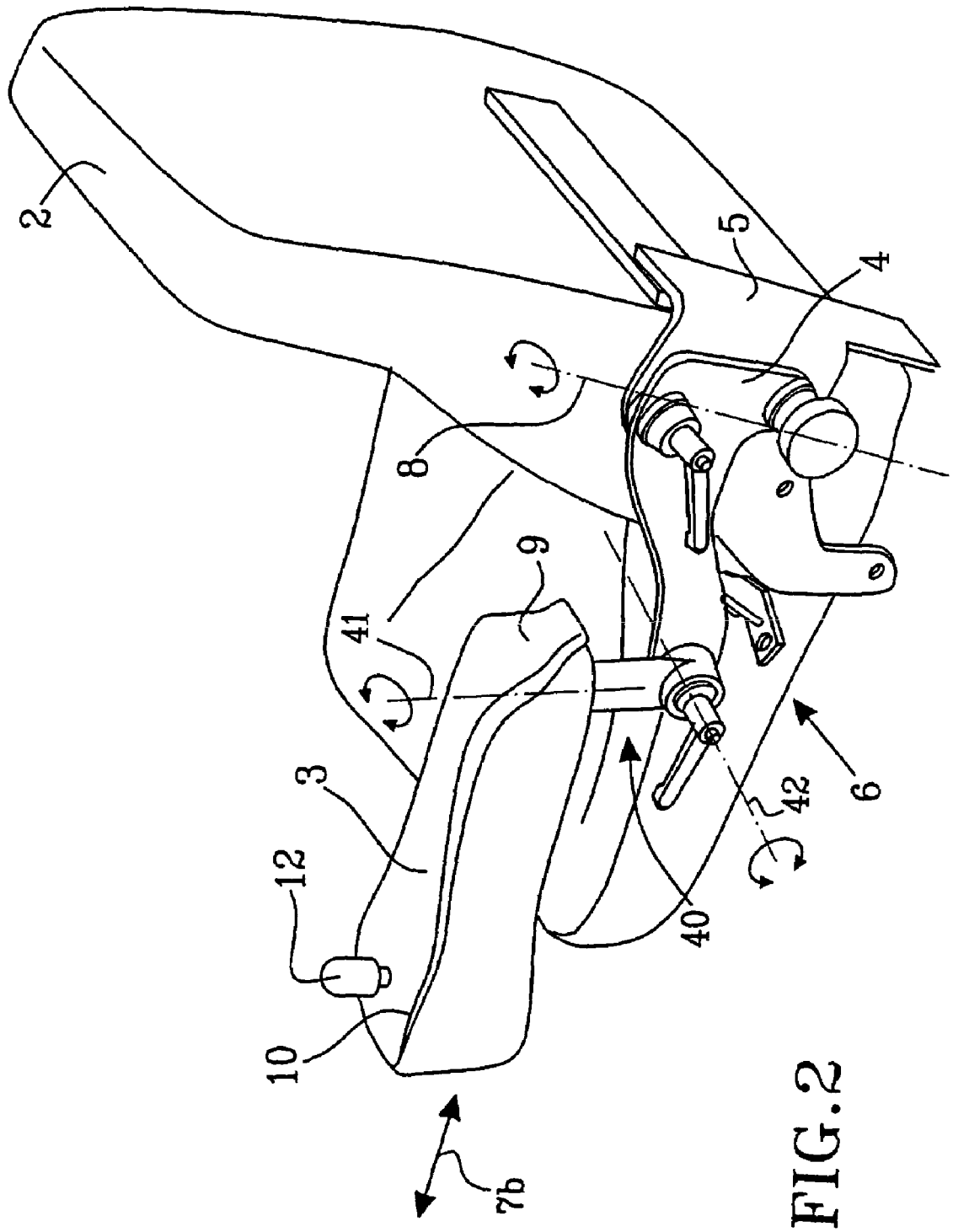
FIG. 2 is a perspective view of the armrest, together with a seat in a vehicle.

FIG. 1 shows a perspective view of an armrest 1 according to the invention and FIG. 2 shows the armrest together with a driver's seat 2 of a vehicle. The armrest comprises (includes, but is not necessarily limited to) a unit 3 for supporting an arm of an operator of the vehicle seated in the seat 2, a first fixing element 4 connected to the armrest unit 3 and a second fixing element 5, which can be fastened to the seat 2 on the vehicle. Although the armrest in the example shown in FIG. 2 is fastened to the driver's seat 2 by means of the second fixing element 5, the armrest in another embodiment could be fastened to another part of the vehicle, such as the vehicle floor, next to the driver's seat, for example.

The first and the second fixing element 4,5 can be coupled together and can be adjusted and locked in relation to one another by means of a device 6 so as to be able to adjust the position of the armrest unit 3 in relation to the seat 2 when using the armrest. The armrest is designed so that the adjusting and locking device 6 can be used to set the armrest unit 3 to different positions by moving the armrest unit 3 in a direction having a component in the horizontal plane, aligned so that the position of the armrest unit 3 is laterally variable in relation to the seat 2. The term "laterally" therefore relates to a horizontal direction which is essentially at right angles to the direction of travel 7 of the vehicle (see FIG. 3). The lateral movement can be performed while essentially maintaining the vertical position of the armrest unit 3.

It must be pointed out that not all positions of the armrest unit 3 need necessarily be moved to the same extent when adjusting the armrest unit in relation to the seat 2. In the case described below (one in which the adjusting and locking device 6 can be used to rotate the first and second fixing element 4, 5 in relation to one another about a geometric axis of rotation 8, which is positioned behind armrest 1 as shown in FIG. 2, for adjusting the reciprocal positions of the first and second fixing element and hence the lateral location of the armrest unit 3 in relation to the seat 2), a section 9 of the armrest unit 3, which is situated close to the center of rotation of the armrest unit on said geometric axis of rotation 8, will be moved a shorter distance than a section 10 of the armrest unit that is situated further away from the center of rotation.

Figure 3:
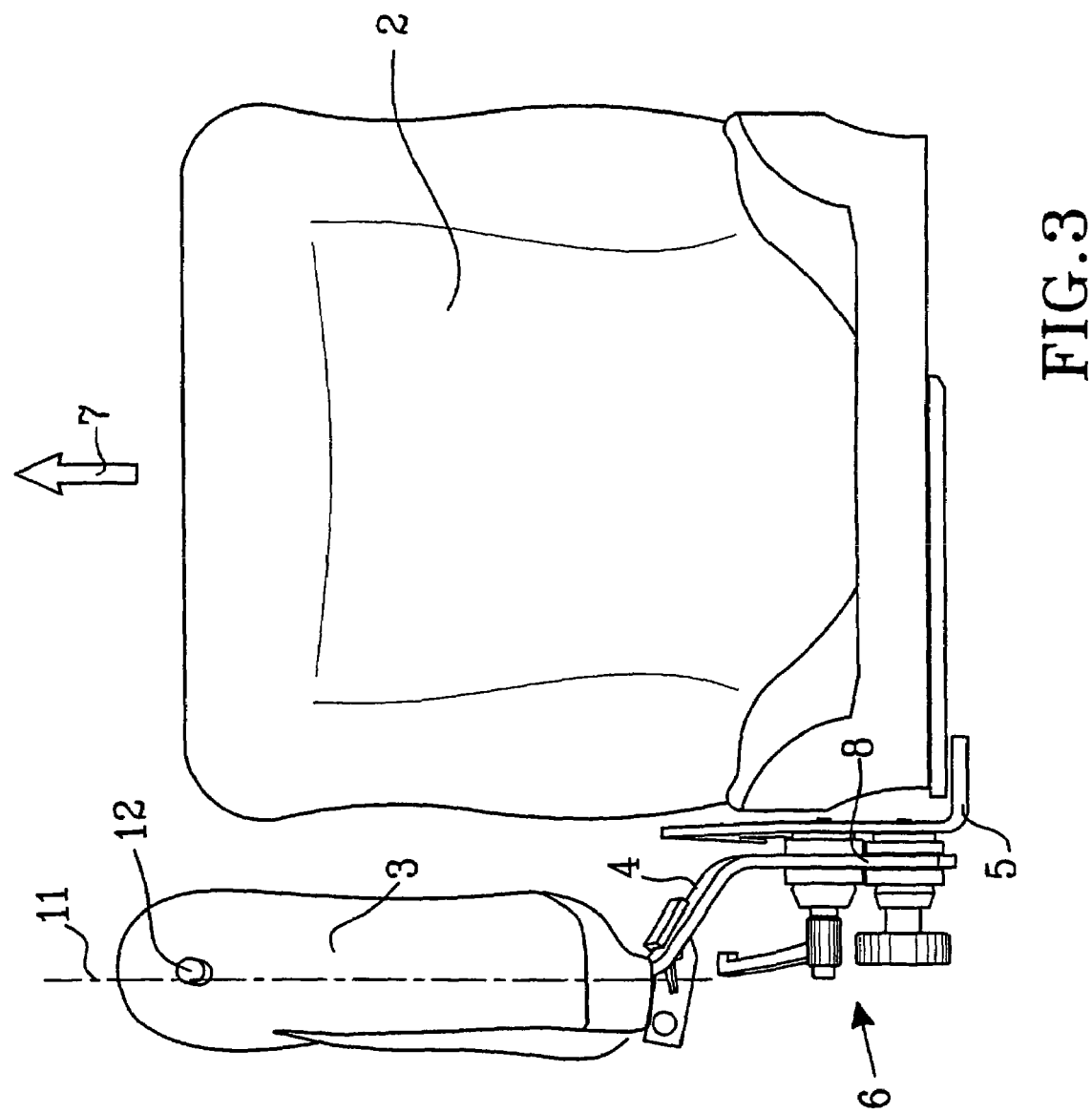
FIG. 3 is a plan view showing the armrest with its armrest unit in a neutral position.
Figure 4:
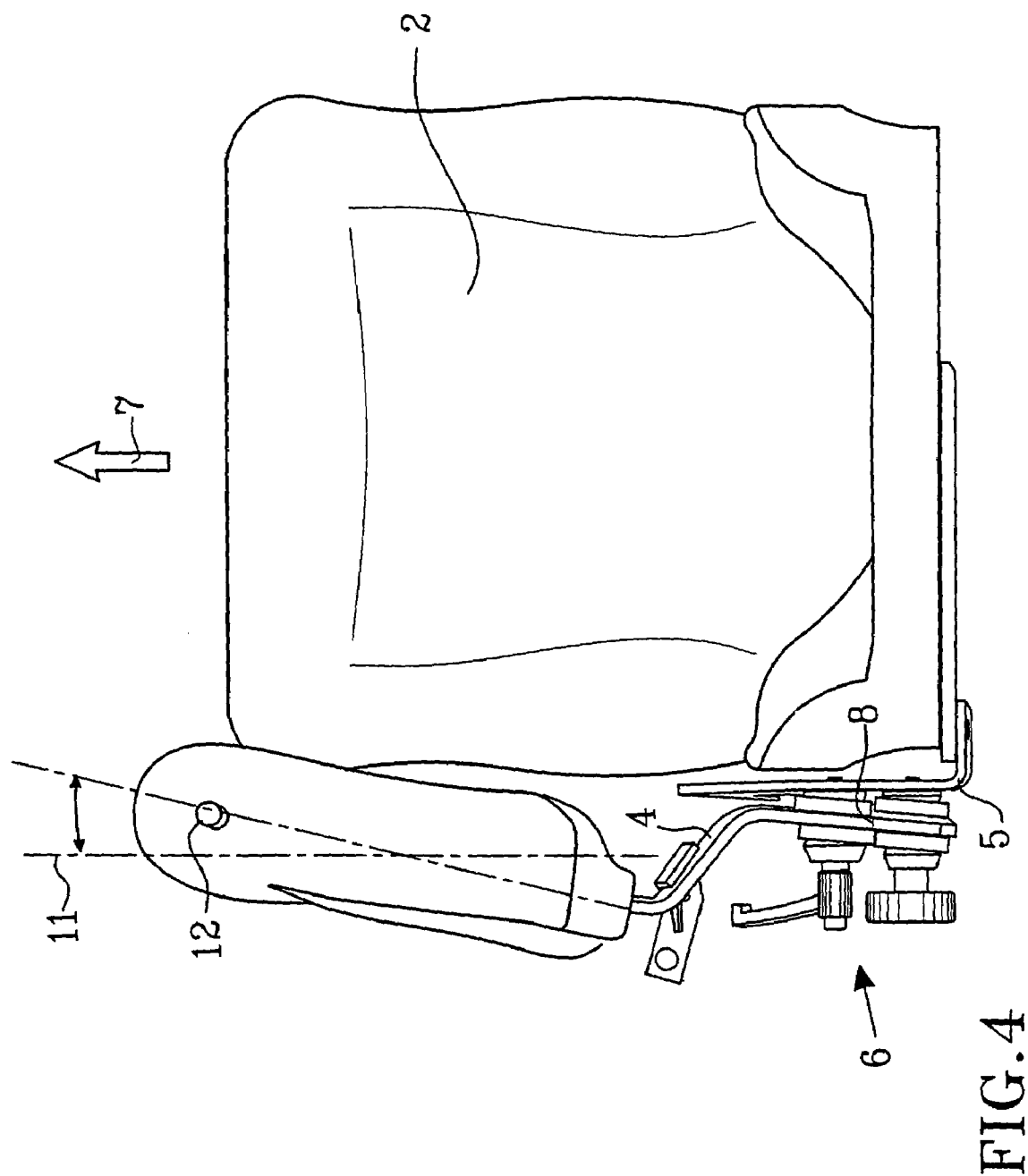
FIG. 4 is a plan view showing the armrest with the armrest unit turned 5° inwards from the neutral position.
Figure 5:
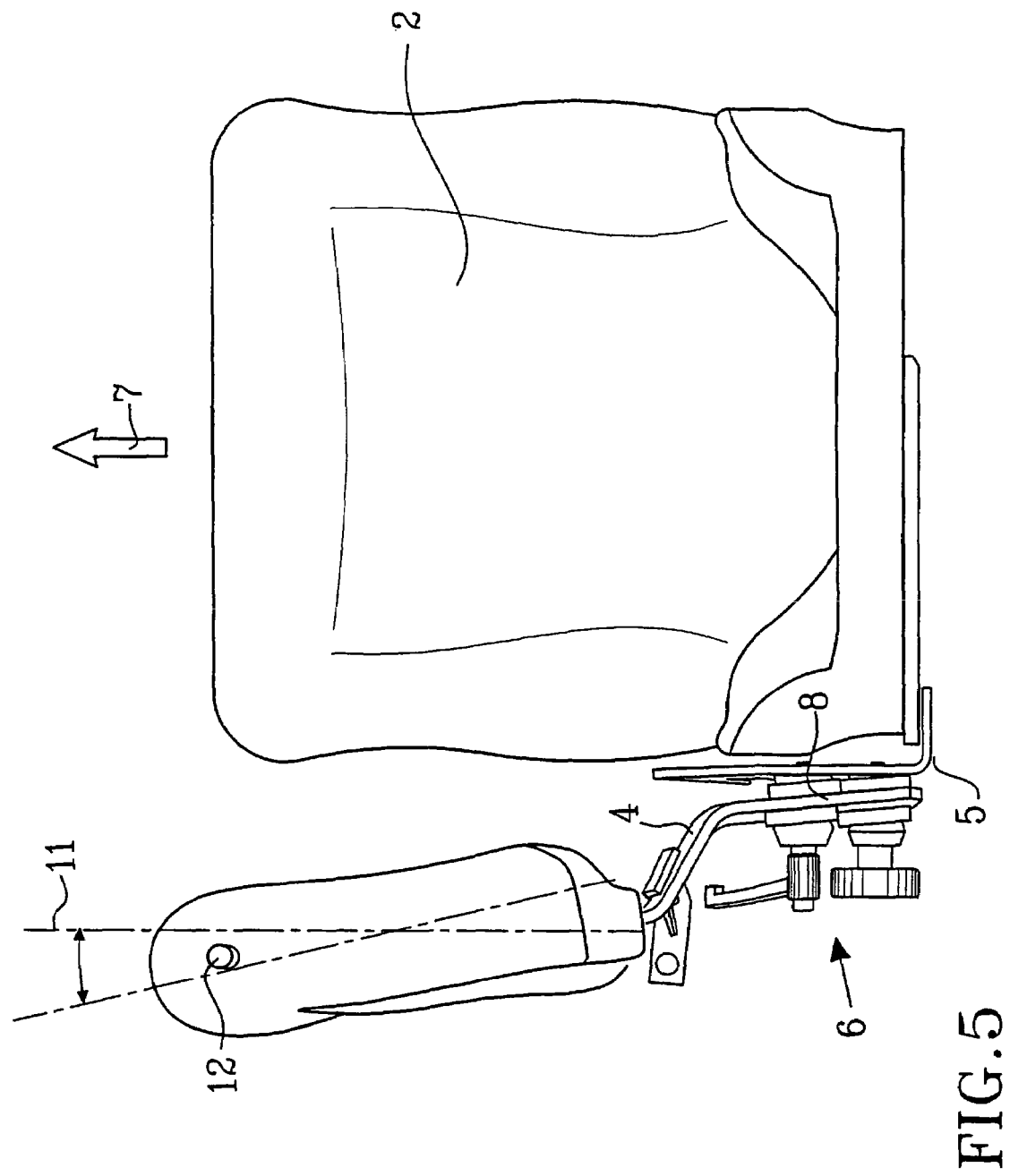
FIG. 5 is a plan view showing the armrest with the armrest unit turned 5° outwards from the neutral position.

FIGS. 3 to 5 show plan views of the armrest 1 with the armrest unit 3 in different positions in relation to the driver's seat 2. In FIG. 3 the armrest unit 3 is in a position corresponding to a neutral position 11. From this neutral position 11, an operator of the vehicle can move the armrest unit 3 outwards or inwards, as required, and lock the armrest unit 3 in the desired position in order to obtain an individually adjusted working position. In FIGS. 4 and 5, the armrest unit 3 is turned approximately 5° inwards or outwards, respectively, about the center of rotation of the armrest unit. The requisite angular interval in which the armrest unit must be adjustable is naturally determined by the size and location of the constituent components and by the magnitude of the difference in body size between different operators. It has been shown, however, that normally a facility for adjustment (advantageously a continuous adjustment) of the armrest unit 3 in an angular interval of 5° about the neutral position 11 meets the requirements of different operators for an individually adjusted working position.

The armrest 1, however, preferably has a further conventional adjusting mechanism 40 (see FIG. 2) with a vertical geometric axis of rotation 41 so that after turning about the center of rotation, the armrest unit 3 can be turned in the opposite direction about the vertical axis of rotation 41, so that the result of the two rotational movements of the armrest unit 3 is a lateral movement which means that the armrest unit 3 is set to a new position in which the armrest unit extends parallel to its extent in the original, neutral position prior to the rotational movements.

Figure 6:
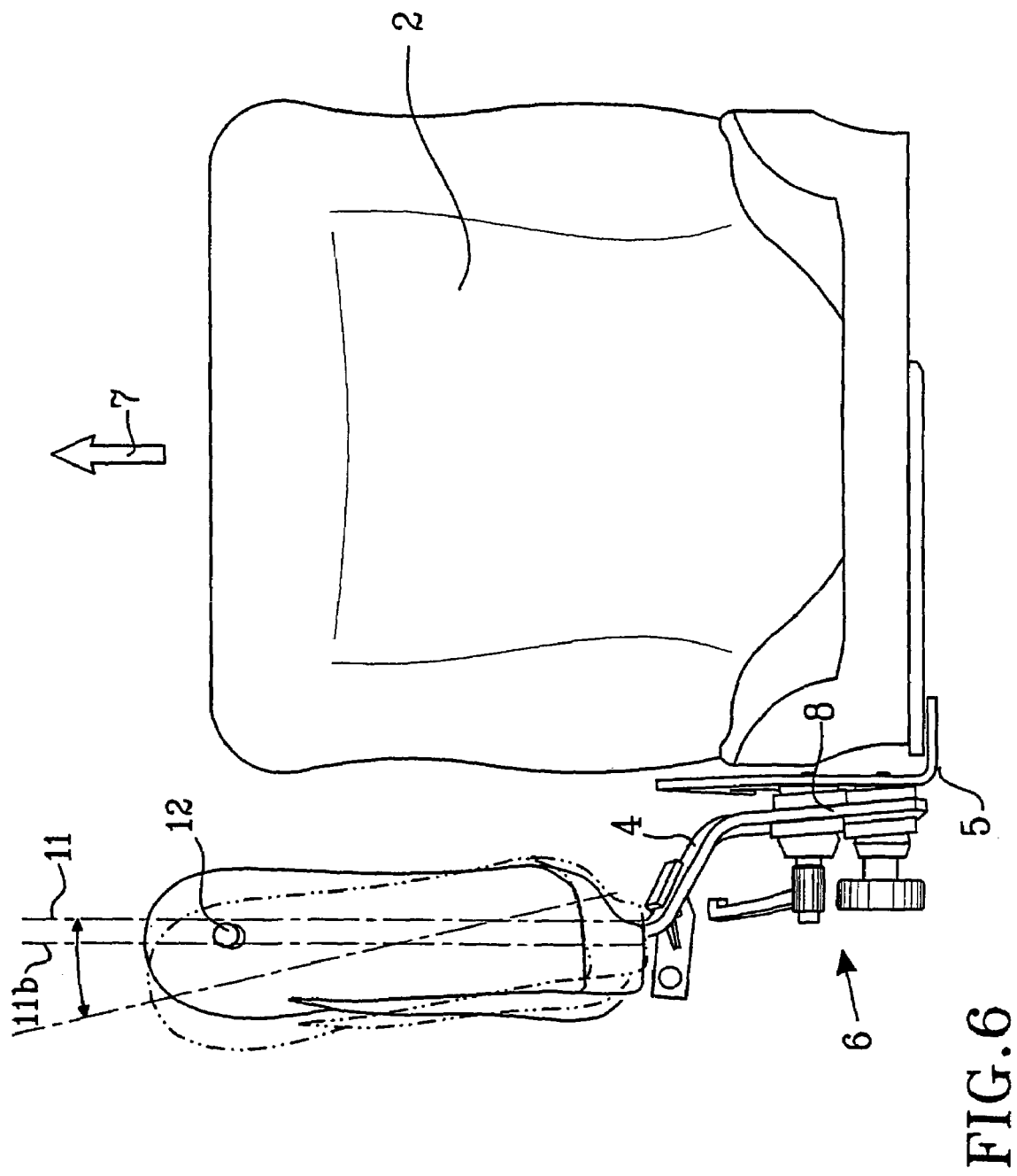
FIG. 6 is a plan view showing the armrest with the armrest unit turned backwards about a further vertical axis of rotation from the position corresponding to that in FIG. 5 to a position in which the armrest unit is parallel to the original position in the neutral position.

FIG. 6 shows how the armrest unit 3 has first been turned outwards from the driver's seat 2 about the geometric axis of rotation 8 and the armrest unit 3 has then been turned inwards towards the driver's seat 2 about said vertical axis of rotation 41, with the result that the armrest unit 3 has been shifted parallel (that is to say moved sideways from the neutral position 11) to the new position 11b. Similarly, by means of two rotations of the armrest unit in opposite directions about the two geometric axes of rotation 8, 41, the armrest unit can be shifted parallel in a direction towards the driver's seat. The further adjusting mechanism 40 may also comprise the conventional functions for moving the armrest unit between an operating position in which the armrest unit is essentially horizontal, as shown in FIG. 2, and a raised, passive position. The mechanism 40 may also be used for allowing movement of the armrest unit in the longitudinal direction 7b of the armrest unit, that is to say, essentially forwards and backwards 7 when the armrest unit is in the operating position. Movement between the operating position and the raised, passive position can be achieved by rotating about a horizontal geometric axis of rotation 42 of the adjusting mechanism 40.

Figure 7:
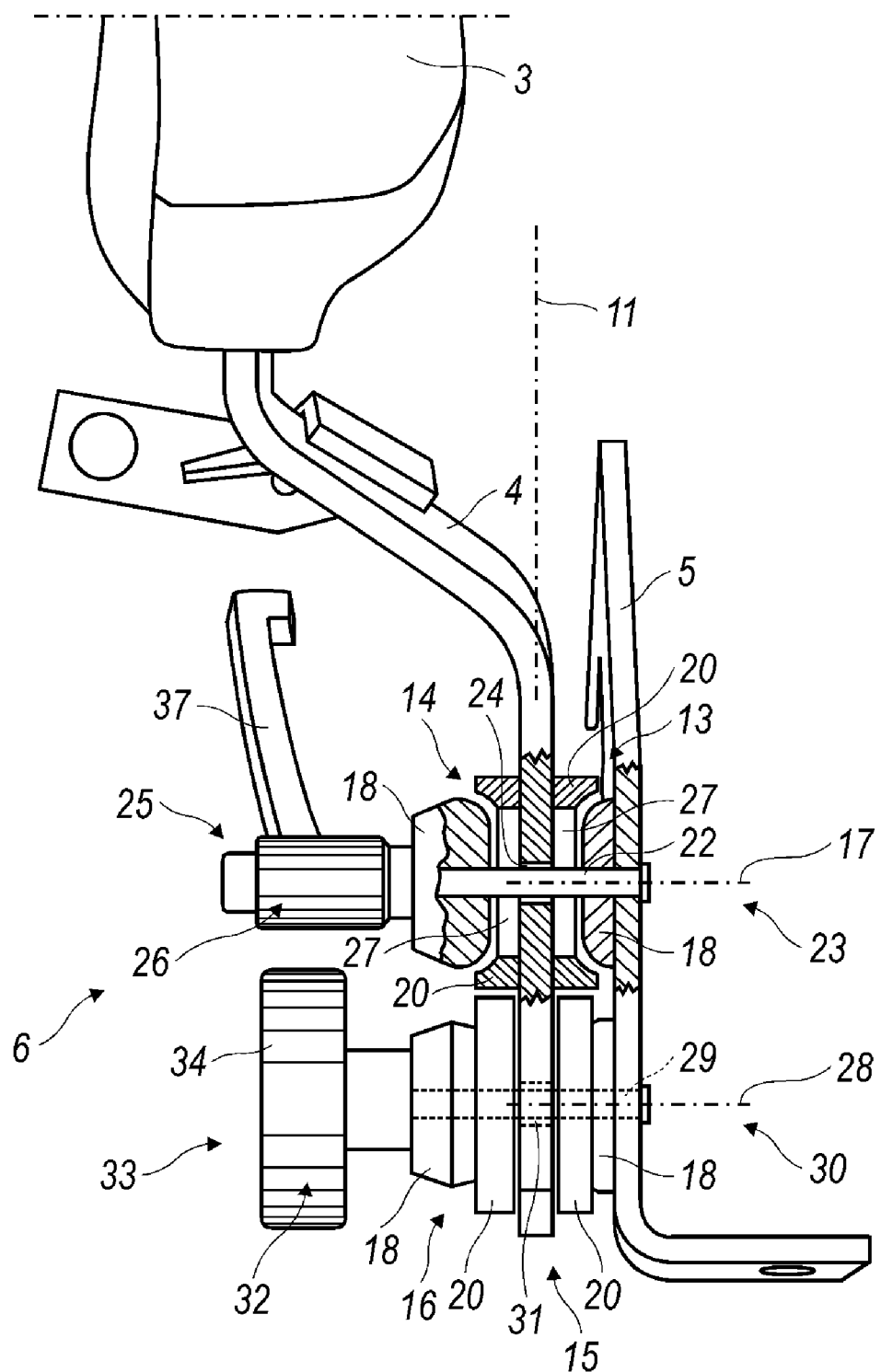
FIG. 7 is a plan view of the armrest adjusting and locking device corresponding to the position of the armrest unit in FIG. 3.
Figure 8:
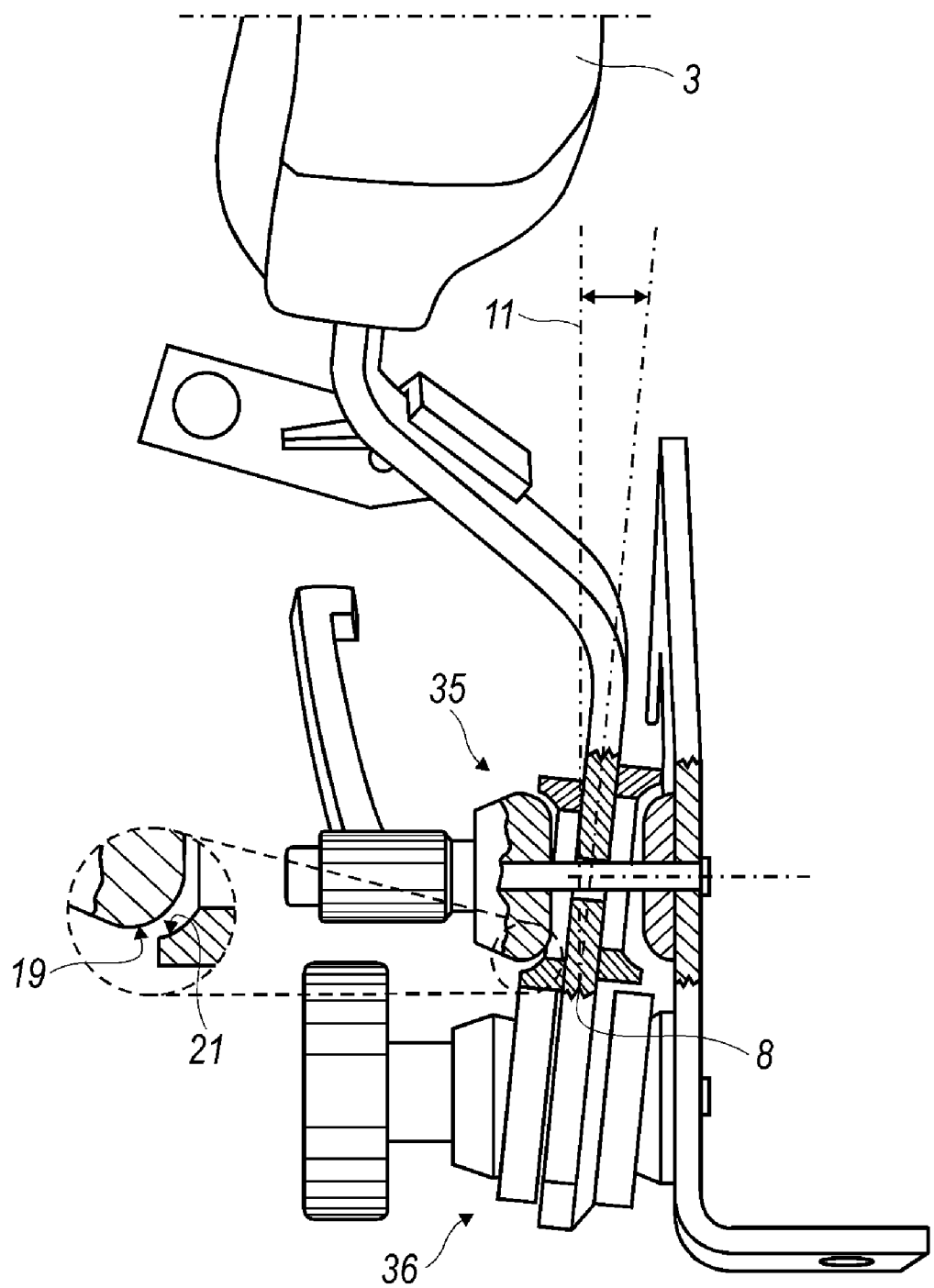
FIG. 8 is a plan view of the armrest adjusting and locking device corresponding to the position of the armrest unit in FIG. 4.
Figure 9:
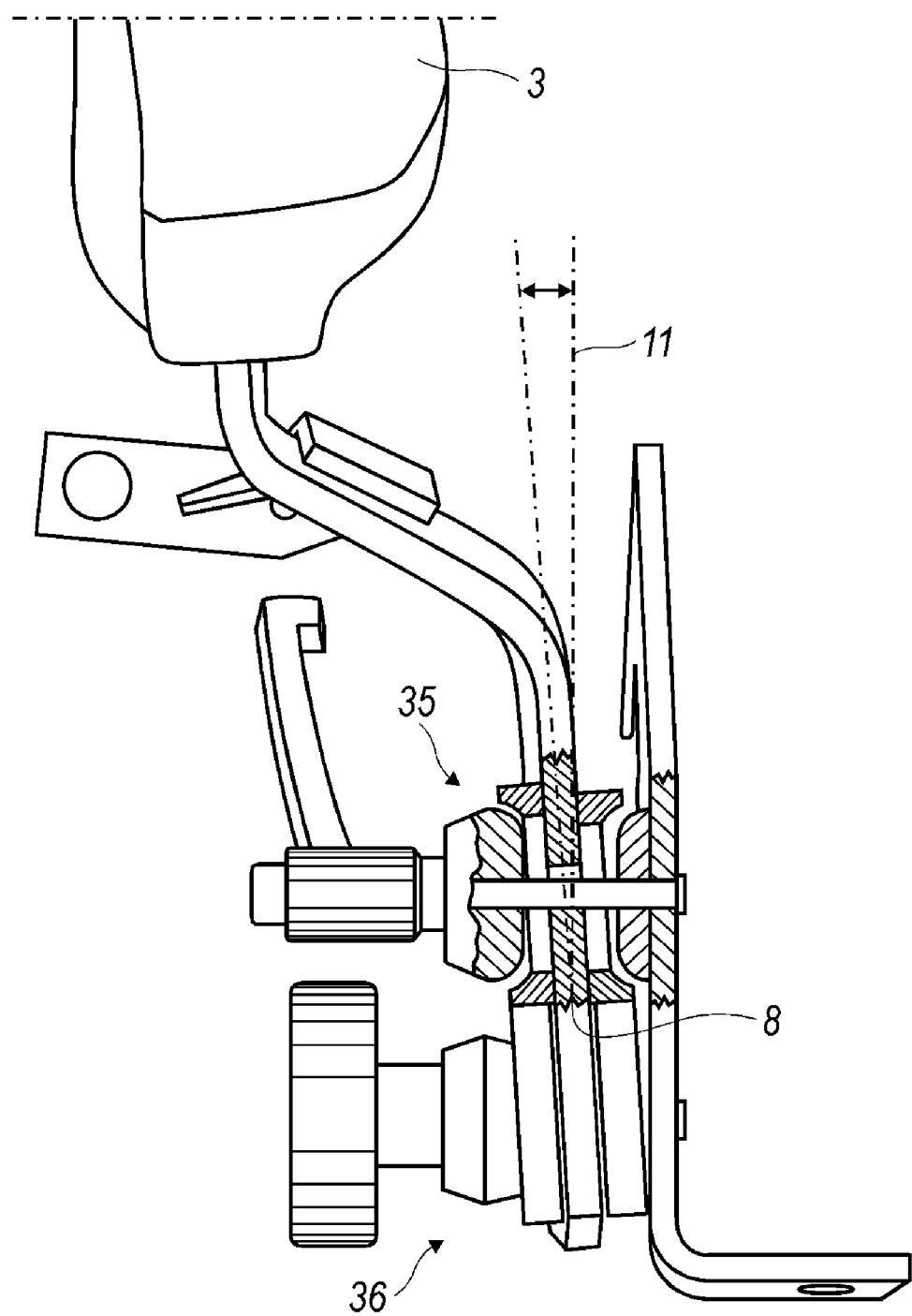
FIG. 9 is a plan view of the armrest adjusting and locking device corresponding to the position of the armrest unit in FIG. 5.

The armrest 1 may be arranged in a vehicle with CDC equipment, such as a wheel loader, for example. In the embodiment shown the armrest is provided with a control lever 12, arranged in the front part of the armrest unit. FIGS. 7 to 9 show the armrest adjusting and locking device 6 in more detail. The adjusting and locking device 6 preferably comprises at least one ball joint 13 for adjusting the reciprocal positions of the first and second fixing elements and hence the position of the armrest unit 3 in relation to the driver's seat 2.

In the embodiment shown in FIG. 7 the armrest 1 comprises the first and second fixing element 4, 5 and the adjusting and locking device 6 for reciprocal adjustment of the two fixing elements has four ball joints 13, 14, 15, 16. The ball joints are arranged in pairs so that a front pair of ball joints 13, 14 is formed by a first ball joint 13 arranged between the first fixing element 4 and the second fixing element 5, and a second ball joint 14, which is arranged laterally inverted on the opposite side of the first fixing element 4 in relation to the first ball joint 13. The first and the second ball joints are arranged along the same geometric longitudinal axis 17 and each of the ball joints 13, 14, 15, 16 comprises a first part 18 having a convex surface 19, preferably spherical in shape, and a second part 20 interacting with the first part 18 and having a corresponding concave surface 21, preferably spherical in shape. The geometric longitudinal axis 17 extends essentially horizontally in a direction essentially at right angles to the direction of travel 7 of the vehicle, in the same way that the armrest 1 is arranged on the driver's seat 2.

The first part 18 and the second part 20 of the first ball joint 13 and the second ball joint 14 are furthermore suitably designed as washers, arranged on a first shaft 22, which at a first end 23 is fixed, by a threaded connection, for example, to the second fixing element 5 and which extends from the second fixing element 5 to the first fixing element 4 along the geometric longitudinal axis 17. Here, the first shaft 22 is configured to extend through a through-hole 24 in the first fixing element 4 and at its free end 25 has a first means 26 for locking the reciprocal positions of the first and second fixing elements 4, 5 by way of the ball joints. The fact that the shaft 22 has a smaller diameter than the through-hole 24 of the first fixing element 4, and that the part 20 of each ball joint arranged closest to the first fixing element 4 and designed as a washer has a through-hole 27 with a diameter larger than that of the shaft 22 means that the first fixing element 4 can be inclined in relation to the first shaft 22, thereby endowing the armrest unit 3 with the required adjustment facility. The first locking means 26 may comprise a grip of suitable type, such as a handle 37, which is connected to the first shaft 22 by a threaded connection, for example.

The adjusting and locking device 6 preferably comprises a further pair of ball joints 15, 16, of corresponding construction to the first pair of ball joints 13, 14. In the embodiment shown in FIGS. 7-9, the adjusting and locking device 6 comprises a third ball joint 15 and a fourth ball joint 16 for this purpose. (It must be emphasized that "first", "second", "third" and "fourth" are to be primarily regarded as designations intended to distinguish the various ball joints, which means, for example, that use of the "third" ball joint in the current position need not necessarily preclude there being a total of fewer than three ball joints in a specific embodiment.) The third ball joint 15 and the fourth ball joint 16 are arranged along a second geometric longitudinal axis 28 coincident with a second shaft 29, which like the first shaft 22 is fastened at one end 30 to the second fixing element 5 and which extends between the two fixing elements 4, 5 and through a through-hole 31 in the first fixing element 4. The second shaft 29 is furthermore provided with a second locking means 32 at its other free end 33 for locking the reciprocal positions of the first fixing element and the second fixing element by way of the ball joints. This second locking means 32 may comprise a grip, such as a wheel 34, which may be connected to the second shaft 29 by a threaded connection, for example.

Regardless of whether the adjusting and locking device 6 comprises one or more ball joints, the two fixing elements must be linked in at least two separate positions 35, 36 in order to obtain a secure and stable locking of the reciprocal positions of the first and second fixing element 4, 5. Where the first and the second fixing element are rotatably connected, as described above, these two positions 35, 36 should furthermore be offset in relation to one another in a direction extending at right angles to the geometric axis of rotation 8 of the first and second fixing element 4, 5, which means that in the embodiment shown in FIGS. 6-8 the second shaft 29 is arranged behind the first shaft 22 in the direction of travel 7 of the vehicle.

When adjusting the armrest 1 according to the invention, a suitable procedure is to release the two locking means 26, 32 (that is to say, in the embodiment shown) by operating the front handle 27 and the rear wheel 34, arranged on the first shaft 22 and the second shaft 29 respectively, to such a degree that the armrest unit 3 can be turned to the desired position and the armrest unit 3 then clamped by tightening firstly the front locking means 26 and then the rear locking means 32.

Although the embodiment illustrated has advantages, such as affording a stable construction and ease of handling by an operator, the person skilled in the art might well suggest other embodiments of the invention once the idea of the invention has been presented to him. It should be emphasized therefore that the invention is limited only by the scope defined by the patent claims. For example, instead of manual adjustment and locking some other adjusting and locking device might be used such as an electrically operated one.

What is claimed is:

1. An armrest arrangement (1) for a construction equipment operator seat, wherein the armrest arrangement is configured for lateral adjustment in order to accommodate operators of different size, said armrest arrangement (1) comprising:
    a unit (3) for supporting an arm of an operator of a vehicle seated in the seat; and
    a first fixing element (4) connected to the unit (3) and a second fixing element (5), which can be fastened to the seat (2) on the vehicle, wherein the first and the second fixing elements can be adjusted and locked in relation to one another by means of a device (6) for adjusting the position of the unit (3) in relation to the seat when using the armrest so that when using the armrest, the adjusting and locking device (6), which connects the first fixing element (4) to the second fixing element (5) at at least two different positions (35,36), is useable to set the unit (3) to different positions by moving the unit laterally in a direction having a component in a horizontal plane so that the position of the unit is laterally variable in relation to the seat (2);
    wherein the adjusting and locking device (6) comprises a first ball joint (13) for adjusting reciprocal positions of the first and second fixing elements (4,5) and for adjusting the lateral position of the unit (3) in relation to the seat (2) and a second ball joint (14) arranged along the same geometric axis (17) as the first ball joint (13);
    wherein the first ball joint (13) comprises a first part (18) having a convex surface (19) and a second part (20) interacting with the first part and having a corresponding concave surface (21), the first and second parts being arranged between the first and second fixing elements (4,5); and
    wherein the second ball joint (14) comprises a first part (18) having a convex surface (19) and a second part (20) interacting with the first part and having a corresponding concave surface (21), the first and second parts of said second ball joint (14) being arranged on a first shaft (22) on the opposite side of the first or the second fixing element (4,5) to the first and second part of the first ball joint (13).

2. The construction equipment operator seat armrest arrangement (1) as recited in claim 1, wherein the adjusting and locking device (6) is useable to rotate the first and second fixing element (4,5) in relation to one another about a geometric axis of rotation (8) for adjusting reciprocal positions of the first and second fixing element and the lateral position of the unit (3) in relation to the seat (2).

3. The construction equipment operator seat armrest arrangement (1) as recited in claim 2, wherein the adjusting and locking device (6) is useable to rotate the first and second fixing element (4,5) in relation to one another in an angular interval of at least five degrees.

4. The construction equipment operator seat armrest arrangement (1) as recited in claim 2, wherein the adjusting and locking device (6) comprises a second shaft (29) which is essentially parallel to the first shaft (22) and which extends from the first fixing element (4) to the second fixing element (5), wherein the first and second shafts (22,29) are offset in relation to one another essentially at right angles to the direction in which the first and second shafts extend; shafts and in relation to the geometric axis of rotation (8) of the first and second fixing elements (4,5).

5. The construction equipment operator seat armrest arrangement (1) as recited in claim 4, wherein the second shaft (29) is fastened at a first end (30) to either the first or the second fixing element (4,5) and is designed to extend through a through-hole (31) in the other of the fixing elements (4,5).

6. The construction equipment operator seat armrest arrangement (1) as recited in claim 1, wherein the adjusting and locking device (6) is useable for continuous adjustment of the first and second fixing element (4,5) in relation to one another.

7. The construction equipment operator seat armrest arrangement (1) as recited in claim 1, wherein the first shaft (22) extends from the first fixing element (4) to the second fixing element (5).

8. The construction equipment operator seat armrest arrangement (1) as recited in claim 7, wherein the first shaft (22) is fastened to one of the first fixing element (4) and the second fixing element (5) and the first shaft (22) is configured to extend through a throughhole (24) in the other of the fixing elements (4 or 5).

9. The construction equipment operator seat armrest arrangement (1) as recited in claim 8, wherein the adjusting and locking device (6) comprises a first means (26) arranged at another end (25) of said first shaft (22) for locking reciprocal positions of the first and second fixing elements (4,5).

10. The construction equipment operator seat armrest arrangement (1) as recited in claim 1, wherein the adjusting and locking device (6) comprises a third ball joint (15).

11. The construction equipment operator seat armrest as recited in claim 10, wherein the third ball joint (15) comprises a first part (18) having a convex surface (19) and a second part (20) interacting with the first part and having a corresponding concave surface (21), and the first and second parts (18,20) are arranged between the first and second fixing elements (4,5).

12. The construction equipment operator seat armrest arrangement (1) as recited in claim 10, wherein a first part (18) and a second part (20) of the third ball joint (15) are designed as washers arranged on a second shaft (29).

13. The construction equipment operator seat armrest arrangement (1) as recited in claim 5, wherein the adjusting and locking device (6) comprises a second means (32) arranged at another end (33) of said second shaft (29) for locking reciprocal positions of the first and second fixing elements (4,5).

14. The construction equipment operator seat armrest arrangement (1) as recited in claim 1, wherein the unit (3) is provided with a member (12) for controlling the vehicle.

15. The construction equipment operator seat armrest arrangement (1) as recited in claim 1, wherein the control member is a control lever (12).

16. A construction equipment operator seat (2) having a construction equipment operator seat armrest that is laterally adjustable in order to accommodate operators of different sizes, said construction equipment operator seat comprising:
    a backrest; and
    an armrest arrangement according to claim 1 that is attached to said backrest.

17. A construction machine including a construction equipment operator seat (2) having a construction equipment operator seat armrest that is laterally adjustable in order to accommodate operators of different sizes, said construction machine comprising:
    a motorized wheeled chassis;
    a construction equipment operator seat according to claim 16 mounted on said motorized wheeled chassis.

18. An armrest arrangement (1) for a construction equipment operator seat, wherein the armrest arrangement is configured for lateral adjustment in order to accommodate operators of different size, said armrest arrangement (1) comprising:
    a unit (3) for supporting an arm of a vehicle operator seated in the seat; and
    a first fixing element (4) connected to the unit (3) and a second fixing element (5), which can be fastened to the seat (2) on the vehicle, wherein the first and the second fixing elements can be adjusted and locked in relation to one another by means of a device (6) for adjusting the position of the unit (3) in relation to the seat when using the armrest so that when using the armrest, the adjusting and locking device (6), which connects the first fixing element (4) to the second fixing element (5) at at least two different positions (35,36), is useable to set the unit (3) to different positions by moving the unit laterally in a direction having a component in a horizontal plane so that the position of the unit is laterally variable in relation to the seat (2);
    wherein the adjusting and locking device (6) comprises a first ball joint (13) for adjusting reciprocal positions of the first and second fixing elements (4,5) and for adjusting the lateral position of the unit (3) in relation to the seat (2);
    wherein the adjusting and locking device (6) comprises a third ball joint (15) with a first part (18) and a second part (20) of the third ball joint (15) being designed as washers arranged on a second shaft (29); and
    wherein the adjusting and locking device (6) comprises a further ball joint (16) with a first part (18) having a convex surface (19) and a second part (20) interacting with the first part and having a corresponding concave surface (21), wherein the first and second parts of said further ball joint (16) are arranged on and second shaft (29) on the opposite side of an first or the second fixing element (4,5) to the first and the second part of the third ball joint (15).

19. The armrest arrangement (1) as recited in claim 18, wherein the unit (3) is provided with a control member (12) for controlling the vehicle.

20. The armrest arrangement (1) as recited in claim 19, wherein the control member (12) is a control lever.

* * * * *